United States Patent
Clements

(10) Patent No.: US 9,334,180 B2
(45) Date of Patent: May 10, 2016

(54) PROCESS FOR TREATING ACID MINE DRAINAGE

(71) Applicant: James George Clements, Brentwood, NH (US)

(72) Inventor: James George Clements, Brentwood, NH (US)

(73) Assignee: Montgomery Chemicals LLC, Conshohocken, PA (US)

( * ) Notice: Subject to any disclaimer, the term of this patent is extended or adjusted under 35 U.S.C. 154(b) by 156 days.

(21) Appl. No.: 14/103,306

(22) Filed: Dec. 11, 2013

(65) Prior Publication Data

US 2014/0166583 A1    Jun. 19, 2014

Related U.S. Application Data

(60) Provisional application No. 61/737,328, filed on Dec. 14, 2012.

(51) Int. Cl.
| | | |
|---|---|---|
| *C02F 1/48* | (2006.01) | |
| *C02F 1/52* | (2006.01) | |
| *C02F 1/56* | (2006.01) | |
| *C02F 1/66* | (2006.01) | |
| C02F 101/20 | (2006.01) | |
| C02F 103/10 | (2006.01) | |

(52) U.S. Cl.
CPC ............... *C02F 1/5236* (2013.01); *C02F 1/488* (2013.01); *C02F 1/56* (2013.01); *C02F 1/66* (2013.01); *C02F 2001/5218* (2013.01); *C02F 2101/20* (2013.01); *C02F 2101/203* (2013.01); *C02F 2101/206* (2013.01); *C02F 2103/10* (2013.01)

(58) Field of Classification Search
CPC .......... C02F 1/5236; C02F 1/488; C02F 1/56; C02F 1/66; C02F 2001/5218; C02F 2101/20; C02F 2101/203; C02F 2101/206
See application file for complete search history.

(56) References Cited

U.S. PATENT DOCUMENTS

| | | |
|---|---|---|
| 2,937,143 A | 5/1960 | Goren |
| 4,138,539 A | 2/1979 | Landolt et al. |
| 4,289,540 A | 9/1981 | Yong et al. |
| 5,286,806 A | 2/1994 | Neff et al. |
| 5,505,857 A | 4/1996 | Misra et al. |
| 5,530,069 A | 6/1996 | Neff et al. |
| 5,645,730 A | 7/1997 | Malachosky et al. |
| 5,879,564 A | 3/1999 | Farinato |
| 5,945,494 A | 8/1999 | Neff et al. |
| 6,667,374 B2 | 12/2003 | Hernandez-Barajas et al. |
| 6,866,689 B2 | 3/2005 | Lumsden et al. |
| 7,033,507 B2 | 4/2006 | Zhuang |
| 2011/0147306 A1 | 6/2011 | Polizzotti et al. |

FOREIGN PATENT DOCUMENTS

WO    2007047481 A2    4/2007

OTHER PUBLICATIONS

D. B. Johnson et al., "Acid mine drainage remediation options: a review," Science of the Total Environment 338 (2005) 3-14.

*Primary Examiner* — David A Reifsnyder
(74) *Attorney, Agent, or Firm* — Paul & Paul

(57) ABSTRACT

A stream of acid mine discharge is treated by mixing an alkaline aqueous solution of sodium borohydride to form a precipitate which is separated from the stream.

18 Claims, 2 Drawing Sheets

PROCESS FOR TREATING ACID MINE DRAINAGE

CROSS-REFERENCE TO RELATED APPLICATION

This application claims the priority of U.S. Provisional Application No. 61/737,328 filed Dec. 14, 2012, which is incorporated herein by reference.

FIELD OF THE INVENTION

The present invention relates to a process and compositions for treating water such as acid mine discharge having high iron content as well as water containing other minerals including nickel, manganese, strontium and other elements not desirable in water.

BACKGROUND OF THE INVENTION

Mining or excavation of rock including pyrite and related minerals, such as found with coal formations, can result in water pollution. Exposure of rock containing sulfide minerals such as pyrite ($FeS_2$), marcasite ($FeS_2$ (orthorhombic)), and pyrrhotite ($Fe_{1-x}S$ ($x$=0-0.2)), to the atmosphere, such as by production of coal mine tailings, can result in oxidation of the minerals to sulfuric acid and soluble iron species. Water draining from coal mining tailings and other sources including iron sulfide and related sulfide minerals is commonly referred to as "acid mine drainage" or "acid rock drainage." Acid mine drainage can have high concentrations of iron species, sulfuric acid, as well as other dissolved metal species, including heavy metals such as molybdenum, tungsten, chromium, manganese, nickel, arsenic, vanadium and the like. The composition of the metal species contaminating the water can vary greatly, depending on the source of the water. Likewise, mines originally used for extracting minerals such as silver, gold and copper can also produce a subsequent water drainage containing the above-mentioned dissolved metals.

A number of processes have been employed for treating neutralized and/or otherwise treat mine discharge. For example, acid mine drainage can be treated with bases such as calcium carbonate, calcium oxide, calcium hydroxide, sodium hydroxide, sodium carbonate, and ammonia. In addition to chemical treatments, acid mine discharge has been treated using a variety of biological treatment schemes, employing biological mechanisms to neutralize the waste water and remove metals from solution. Biological mechanisms typically rely on the construction of containment ponds and the like to subject the acid mine discharge to extended biological action.

Treatment with bases may cause the ferrous and ferric ions to precipitate and form a very hydrous, gelatinous hydrated iron hydroxide ($Fe(OH)_{x}$, $x$=2 and 3), which forms difficult to remove flocs.

A number of multi-step processes have been proposed to treat the acid mine drainage in a step-wise manner, frequently for the purpose of recovering specific metal species from the wastewater.

For example, U.S. Pat. No. 5,505,857 ("Misra") discloses a three-step process for selectively recovering metals contained in wastewaters as metal precipitates and/or spinel ferrite and water suitable for discharge into the environment. In the first step, the pH is adjusted and a sulfur compound is added to precipitate at least one non-ferrous metal ion as the sulfide. In the second step, aluminum is removed by further adjusting the pH of contaminated water and adding a precipitant for the aluminum. In the final step, the pH is further adjusted to strongly alkaline and solution is oxidized, and spinel ferrite is precipitated and removed.

U.S. Pat. No. 5,645,730 ("Malachosky") discloses treating acid wastewater containing heavy metals such as acid mine drainage with fly ash to reduce the level of sulfate ions. In one aspect of the process, solid silicates salts are added to avoid the formation of undesirable very hydrous iron precipitates.

Active and passive chemical technologies as well as various biological strategies for treating acid mine drainage are reviewed in D. B. Johnson et al., "Acid mine drainage remediation options: a review," *Science of the Total Environment* 338 (2005) 3-14, incorporated herein by reference.

There is continuing need for a process for treatment of acid mine discharge, particularly for a process which can be used to treat large quantities of wastewater quickly.

SUMMARY OF THE INVENTION

The present invention provides an improved process for treating acid mine discharge. The process advantageously provides a simple method for quickly treating large quantities of acid mine discharge. The process comprises providing a stream of acid mine discharge including iron and providing sodium borohydride. The acid mine discharge can include one or more metals detrimental to water quality, such as iron, manganese, strontium, nickel, and the like. Preferably, the process includes providing sodium borohydride and sufficient alkalinity to provide a mixture of sodium borohydride and acid mine discharge with a pH from about 7 to about 13. The process further includes mixing the sodium borohydride with the stream of acid mine discharge, whereby a precipitate is formed in the mixture. The process also includes separating the precipitate from the stream of acid mine discharge. Preferably, the sodium borohydride is provided as an aqueous solution. In one aspect of the present invention, the aqueous solution is an alkaline aqueous solution which preferably includes sodium hydroxide. Preferably, the sodium borohydride is provided as an aqueous solution of sodium borohydride and sodium hydroxide. In another aspect of the present invention, the alkalinity is provided by the addition of calcium carbonate to the acid mine discharge. In yet another embodiment, the alkalinity is provided by the addition of sodium hydroxide and calcium carbonate to the acid mine discharge. In one embodiment of the process, the acid mine discharge is provided as an aqueous solution having a pH from about 7 to 13. In another embodiment of the present invention, the pH of the mixture of acid mine discharge and sodium borohydride is adjusted to be between from about 7 to 13, such as by the addition of base to the sodium borohydride prior to mixing with the acid mine discharge, or such as by the addition of base to the mixture of sodium borohydride and acid mine discharge. Preferably, the pH of the mixture of acid mine discharge and sodium borohydride is controlled in a ratio to provide optimum effect. In one embodiment of the process, the acid mine discharge is adjusted to a pH of from between 7 and 13 prior to or coincident with the introduction of sodium borohydride provided as an aqueous solution having a pH from about 7 to 13. Preferably, the aqueous solution employed in the process comprises from about 1 to 10 percent by weight sodium borohydride and from about 10 percent to about 42 percent by weight sodium hydroxide. Preferably, in another embodiment the process further comprises providing sodium bisulfite and mixing the sodium bisulfite with the acid mine discharge. Preferably, in this embodiment the weight ratio of sodium borohydride to sodium bisulfite is from about 1 to 6 to about 1 to 12, and more preferably the weight ratio of sodium borohydride to sodium bisulfite is from about 1 to 8 to about 1 to 10. In another aspect, the process includes providing a holding tank for retaining the mixture of sodium borohydride and acid mine discharge. Preferably, the holding tank has a capacity at least 20 times the flow rate of the acid mine discharge. In another embodiment, the process further comprises subjecting the mixture to a magnetic field. Preferably, the magnetic field has an average magnetic field strength in the mixture of from about 0.2 Tesla to about 3 Tesla. In a further embodiment, the process further comprises discharging the acid mine drainage after mixing with sodium borohydride to a retention pond, and preferably retaining the mixture of acid mine drainage and sodium borohydride in the retention pond, preferably for less than 12 hours, more preferably, for less than 6 hours, and still more preferably for less than one hour.

In another aspect, the present invention provides a process for treating acid mine discharge, the process comprising (a) providing a stream of acid mine discharge including iron, the stream having a flow rate; (b) providing sodium borohydride; (c) providing calcium carbonate; (d) mixing the sodium borohydride and the calcium carbonate with the stream of acid mine discharge, a precipitate being formed in the mixture; and (e) separating the precipitate from the stream of acid mine discharge. Preferably, sufficient alkalinity is provided to the mixture of sodium borohydride and acid mine discharge to adjust the pH of the acid mine discharge to a pH from about 7 to about 13. In one aspect, calcium carbonate is provided in the form of limestone. In another aspect, the calcium carbonate is mixed with the acid mine discharge before mixing the sodium borohydride with the acid mine discharge. In yet another aspect, the sodium borohydride is mixed with the acid mine discharge before the calcium carbonate is mixed with the acid mine discharge. In another aspect, sodium borohydride and calcium carbonate are mixed simultaneously with the acid mine discharge.

DETAILED DESCRIPTION

Figure 1:
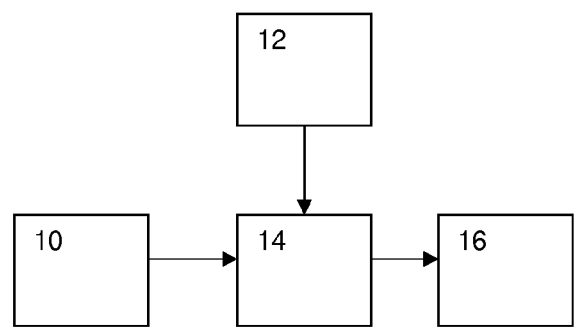
FIG. 1 is a block diagram showing a first presently preferred embodiment of the treatment process of the present invention.

The present invention provides a process for treating acid mine drainage. "Acid mine drainage" is defined as aqueous effluent from mining operations, mill tailings, overburden from mining operations, excavations, acid process waste streams, seepages, and other aqueous flows having elevated levels of metal ions and/or anions. Acid mine drainage is characterized by the presence of metals such as iron, manganese, aluminum, cadmium, cobalt, copper, lead, magnesium, molybdenum, nickel, zinc, and others. Acid mine drainage may also include undesirable anions such as sulfate, fluoride, nitrate and chloride. As used in the present application, "mine" is understood to mean active, inactive or abandoned mining operations for removing minerals, metals, ores or coal from the earth. Environmental regulations promulgated by the Environmental Protection Agency under CAA, RCRA, and CERCLA, as well as those promulgated by state and local authorities, mandate that the concentration of certain minerals and metals in specific aqueous effluents be less than the established regulatory levels.

Precipitation conditions for components of acid mine drainage can be modeled using software available from the U.S. Geological Service. PHREEQCI Version 2 is a computer program for simulating chemical reactions and transport processes in water (see http://wwwbrr.cr.usgs.gov/projects/GWC_coupled/phreeqc/).

To effectively treat acid mine drainage, the present invention provides a process to remove iron from the acid mine drainage in a short time, utilizing a small volume, and without otherwise affecting the water's quality.

Advantageously, after treatment of an acid mine drainage with sodium borohydride, a catch basin or lagoon system can complete the water purification process, preferably with a retention time of less than 12 hours, more preferably, less than 6 hours, and still more preferably, less than one hour.

"Flocculation" means the aggregation of insoluble particles caused by the addition of a suitable flocculating agent to a particulate suspension. "Sedimentation" means the settling of the flocculated precipitated particles. Sedimentation can be effected, for example, by centrifugation, or by gravity. Flocculants useful in the process of the present invention include high molecular weight polymeric materials which achieve flocculation by bridging the suspended particles to be flocculated, as well as low molecular weight materials that adsorb to the surface of the particles to be flocculated and change the surface charge or chemistry to destabilize the particles, permitting them to coagulate. Useful flocculants include synthetic and natural organic polymers that aggregate the suspended solids permitting the solids to settle out of the slurry, resulting in a layer of settled solids and a clarified aqueous stream. Examples of useful high molecular weight water-soluble or water-dispersible flocculants include polyacrylamides such as the partially hydrolyzed, anionic polyacrylamides disclosed, for example, in U.S. Pat. Nos. 5,286,806 and 5,530,069, anionic acrylamide/acrylate copolymers such as disclosed, for example, in U.S. Pat. No. 4,138,539, cationic polyacrylamide copolymers, such as disclosed, for example, in U.S. Pat. Nos. 5,879,564 and 5,945,494, incorporated herein by reference, U.S. Patent Publication 20110147306 A1, polyacrylamides effective in flocculating suspended solids without shearing, such as disclosed in U.S. Pat. No. 6,667,374, incorporated herein by reference, polysaccharides such as hydrolyzed starches such as disclosed, for example, in U.S. Pat. Nos. 2,937,143, and 4,289,540, each enclosed herein by reference, activated starches such as disclosed, for example, in WO 2007/047481, as well as potato starches and corn starches. Lignin derivatives, such as lignosulfonates and kraft lignin, such as disclosed, for example, in U.S. Pat. No. 7,033,507, can also be used. Other examples of flocculants that can be used include methylcellulose, such a Methocel A4M (Dow Chemical Co.), ethylcellulose, hydroxypropylmethylcellulose such as Methocel F4M (Dow Chemical Co.), hydroxyethyl methylcellulose, and carboxy methylcellulose.

The most widely used organic polymeric flocculants are synthetic polyacrylamide ("PAM")-based materials.

By "high molecular weight" is meant an average molecular weight (as determined by light scattering) of at least 100,000, and preferably greater than 1,000,000. By "anionic polymer" is meant a polymeric material having an anionic charge density. By "anionic charge density" is meant the mole percent of monomer residue in a polymer that includes an anionic chemical group, such as a carboxyl, carboxymethyl, phosphate, and sulfate chemical group.

Flocculants typically have a range of concentration over which they are particularly effective. This effective range depends upon a variety of factors, including the average molecular weight, the dispersity (monodisperse vs. polydisperse) of the polymeric flocculant, the monomer composition of the flocculant, the anionic and/or cationic charge density of the flocculant, the conformation of the polymer chains in solution, the pH of the aqueous solution, the nature and extent of crosslinking of the polymer chains if any. The flocculant of the present invention is preferably employed within the effective range.

Examples of flocculants that can be employed in the process of this invention include Metalsorb FZ (SNF Inc., Riceboro, Ga. 31323), Flowquat FL 3249 PWG polyamine, SNF Flo-PAM 956 VHM, and SNF Flo-PAM.

Examples of coagulant flocculants include polydiallyldimethyl ammonium chloride.

Sodium borohydride is employed in the treatment process of the present invention. Preferably, an alkaline aqueous solution of sodium borohydride is used. Preferably, the process includes providing sodium borohydride and sufficient alkalinity to provide a mixture of sodium borohydride and acid mine discharge with a pH from about 7 to about 13. The alkalinity can be provided by the addition of sodium hydroxide, calcium carbonate, such as calcium carbonate in the form of limestone, or both. Sodium hydroxide in solid or aqueous solution can be added to the sodium borohydride, or to the mixture of acid mine discharge and sodium borohydride. Calcium carbonate can be added to an aqueous mixture of sodium borohydride and sodium hydroxide, or calcium carbonate can be added to the mixture of sodium borohydride, sodium hydroxide and acid mine drainage. Alternatively, calcium carbonate can be added to an aqueous solution of sodium hydroxide before mixing with sodium borohydride or a mixture of sodium borohydride and acid mine drainage. The sodium borohydride can be prepared at or near the site where the acid mine drainage is to be treated. Alternatively, the sodium borohydride can be prepared at a site remote from the treatment site, and shipped to the treatment site for use in treating the acid mine drainage. Preferably, the sodium borohydride is prepared as a stable alkaline aqueous solution such as disclosed in U.S. Pat. No. 6,866,689, incorporated herein by reference. Preferably, an aqueous alkaline solution of sodium borohydride and sodium hydroxide is mixed with the acid mine drainage in a proportion of 0.01 by weight sodium borohydride aqueous solution to one hundred parts by weight aqueous mine drainage. Mixing can be accomplished passively, such as, for example, adding a stream of the sodium borohydride aqueous solution to a stream of acid mine drainage, and permitting the streams to mix as they continue to flow. Mixing can also be accomplished actively, such as by adding together a stream of sodium borohydride aqueous solution and a stream of acid mine drainage and actively mixing the streams together by use of mixing equipment, such as conventional paddle stirrers and the like. The mixing can occur in a continuous mode or in a batch mode.

In one aspect of the process of the present invention, sodium bisulfite is provided and mixed with the acid mine drainage. The sodium bisulfite can be premixed with the aqueous alkaline sodium borohydride solution, and the aqueous alkaline mixture of sodium bisulfite and sodium borohydride can then be mixed with the acid mine drainage. Preferably, the weight ratio of sodium borohydride to sodium bisulfite is from about 1 to 6 to 1 to 12, and more preferably from about 1 to 8 to 1 to 10.

After mixing the acid mine drainage and the sodium borohydride and optional flocculant, the mixture can be discharged to a retention pond to permit the sodium borohydride to react with the acid mine drainage. Retention ponds are well known in the waste water treatment arts. Preferably, the mixture of acid mine drainage and sodium borohydride is retained in the retention pond for a period effective to substantially remove the dissolved and/or suspended iron from the acid mine drainage. The removed iron is retained in the retention pond. By "substantially remove" is meant removal of at least ninety percent by weight. Preferably, the mixture of acid mine drainage and sodium borohydride is retained in the retention pond for less than 12 hours, more preferably, for less than 6 hours, and still more preferably, for less than one hour.

In one aspect of the process of the present invention, a magnetic field is applied to the acid mine drainage to aid in removing suspended solids and/or flocculated solids including iron, such as iron in the form of ferrite. Preferable, the mixture of sodium borohydride and acid mine waste is exposed to a magnetic field provided with permanent magnets and/or electromagnets. Preferably, the average magnetic field strength is from about 0.2Tesla to about 3 Tesla.

In a first presently preferred embodiment of the present invention, as illustrated in the flow diagram of FIG. 1, a stream of acid mine discharge 10 containing iron is provided. Sodium borohydride 12 is also provided. The sodium borohydride is preferably provided in the form of an alkaline aqueous solution, such as BoroMet 1240 (Montgomery Chemicals LLC, Conshohocken, Pa.), a solution of 12 percent by weight NaBH4 in a 40 percent by weight sodium hydroxide solution. The acid mine discharge 10 and the sodium borohydride are mixed in suitable mixing equipment 14. Preferably, the application rate of the sodium borohydride to the acid mine discharge is determined by analysis of the iron content of the acid mine discharge. The alkaline mine discharge and the sodium borohydride can be mixed in batches, or the sodium borohydride can be provided as a continuous stream to a stream of alkaline mine discharge using suitable metering equipment. Upon mixing, an iron-containing precipitate 16 is formed and the precipitate 16 is separated from the stream of treated acid mine discharge.

Figure 2:
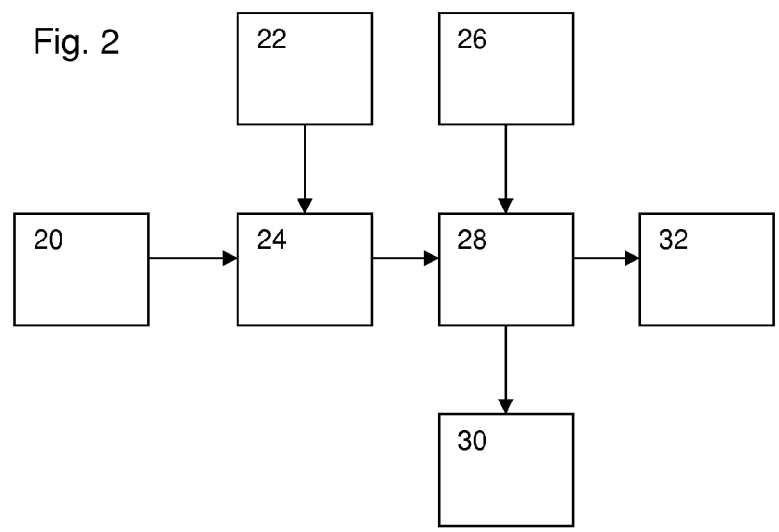
FIG. 2 is a block diagram showing a second presently preferred embodiment of the treatment process of the present invention.

In a second presently preferred embodiment, as illustrated in the flow diagram of FIG. 2, a stream of acid mine discharge 20 containing iron is provided. Sodium borohydride 22 is also provided. The sodium borohydride is preferably provided in the form of an alkaline aqueous solution, such as a solution of 12 percent by weight NaBH4 in a 40 percent by weight sodium hydroxide solution. The acid mine discharge 20 and the sodium borohydride are mixed in suitable mixing equipment 24. Preferably, the application rate of the sodium borohydride to the acid mine discharge is determined by analysis of the iron content of the acid mine discharge. The alkaline mine discharge and the sodium borohydride can be mixed in batches, or the sodium borohydride can be provided as a continuous stream to a stream of alkaline mine discharge using suitable metering equipment. After acid mine discharge and the sodium borohydride are mixed 28, or concomitant with the mixing of the acid mine discharge and the sodium borohydride (not shown), a flocculant 26 is added to aid in forming an iron-containing precipitate 30 which is separated from the stream of treated acid mine discharge 32.

Figure 3:
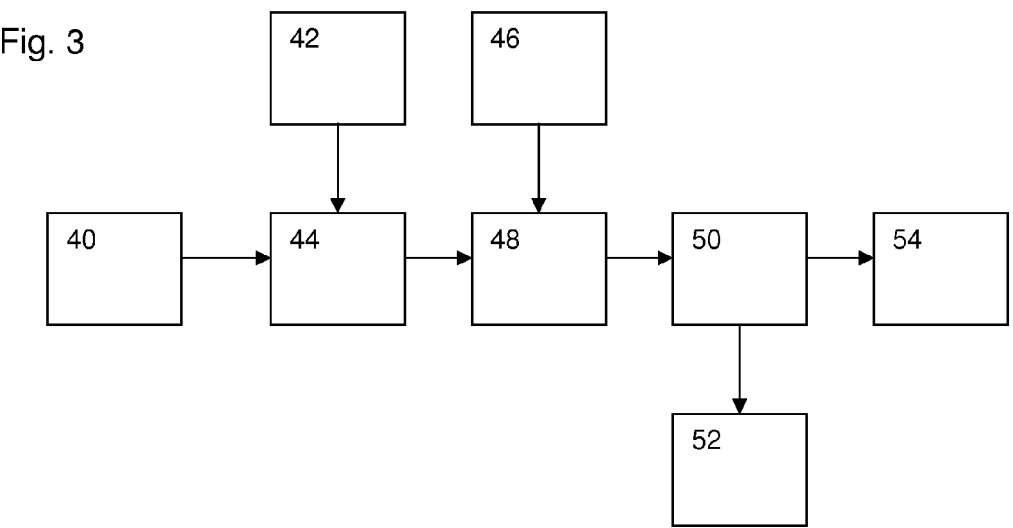
FIG. 3 is a block diagram showing a third presently preferred embodiment of the treatment process of the present invention.

In a third presently preferred embodiment, as illustrated in the flow diagram of FIG. 3, a stream of acid mine discharge 40 containing iron is provided. Sodium borohydride 42 is also provided. The sodium borohydride is preferably provided in the form of an alkaline aqueous solution, such as a solution of 12 percent by weight NaBH4 in a 40 percent by weight sodium hydroxide solution. The acid mine discharge 40 and the sodium borohydride are mixed in suitable mixing equipment 44. Preferably, the application rate of the sodium borohydride to the acid mine discharge is determined by analysis of the iron content of the acid mine discharge. The alkaline mine discharge and the sodium borohydride can be mixed in batches, or the sodium borohydride can be provided as a continuous stream to a stream of alkaline mine discharge using suitable metering equipment. After acid mine discharge and the sodium borohydride are mixed 48, or concomitant with the mixing of the acid mine discharge and the sodium borohydride (not shown), a flocculant 46 is added, an iron-containing precipitate 52 forms, which is permitted to settle out over a predefined period in a hold tank 50. The iron-containing precipitate 52 is then separated from the stream of treated acid mine discharge 54.

Figure 4:
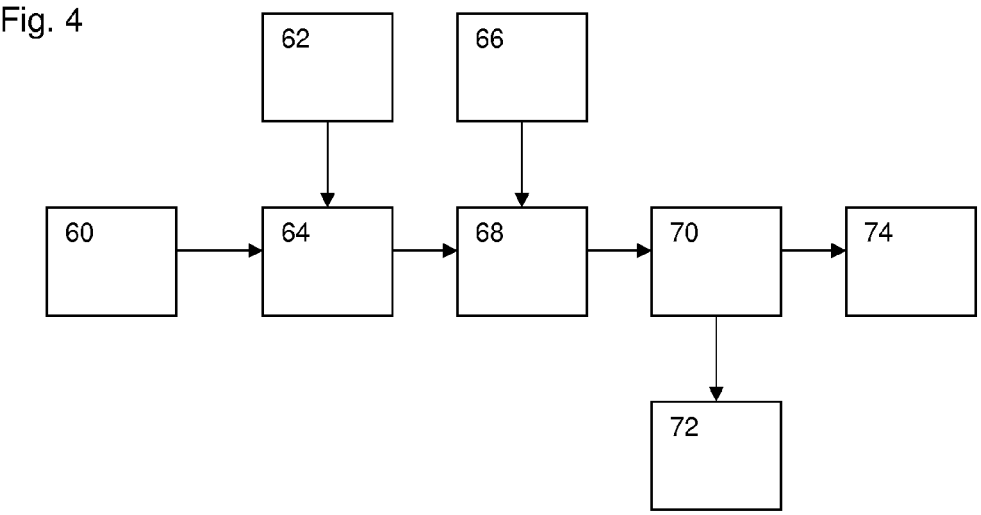
FIG. 4 is a block diagram showing a fourth presently preferred embodiment of the treatment process of the present invention.

In a fourth presently preferred embodiment, as illustrated in the flow diagram of FIG. 4, a stream of acid mine discharge 60 containing iron is provided. Sodium borohydride 62 is also provided. The sodium borohydride is preferably provided in the form of an alkaline aqueous solution, such as a solution of 12 percent by weight NaBH4 in a 40 percent by weight sodium hydroxide solution. The acid mine discharge 60 and the sodium borohydride are mixed in suitable mixing equipment 64. Preferably, the application rate of the sodium borohydride to the acid mine discharge is determined by analysis of the iron content of the acid mine discharge. The alkaline mine discharge and the sodium borohydride can be mixed in batches, or the sodium borohydride can be provided as a continuous stream to a stream of alkaline mine discharge using suitable metering equipment. After acid mine discharge and the sodium borohydride are mixed 68, or concomitant with the mixing of the acid mine discharge and the sodium borohydride (not shown), a base such as sodium hydroxide or lime 66 is added to aid in forming an iron-containing precipitate 72, which is permitted to settle out over a predefined period in a hold tank 70. The iron-containing precipitate 72 is then separated from the stream of treated acid mine discharge 74.

Figure 5:
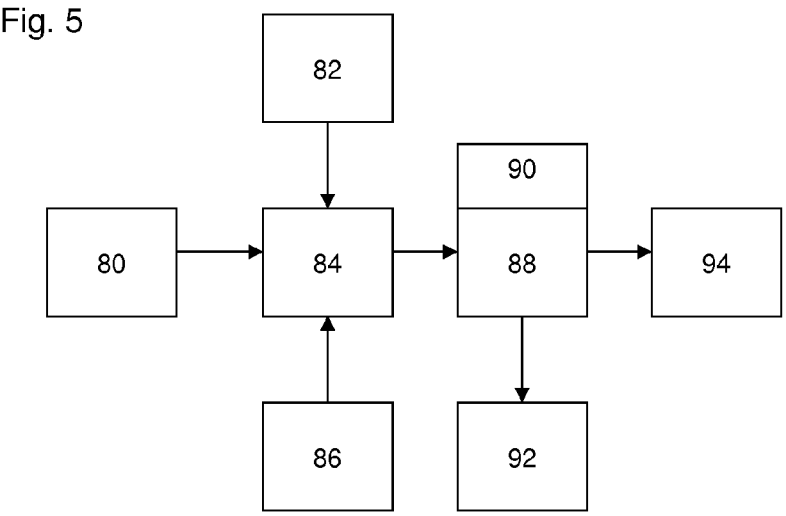
FIG. 5 is a block diagram showing a fifth presently preferred embodiment of the treatment process of the present invention.

In a fifth presently preferred embodiment, as illustrated in the flow diagram of FIG. 5, a stream of acid mine discharge 80 containing iron is provided. Sodium borohydride 82 is also provided. The sodium borohydride is preferably provided in the form of an alkaline aqueous solution, such as a solution of 12 percent by weight NaBH4 in a 40 percent by weight sodium hydroxide solution. The acid mine discharge 80 and the sodium borohydride are mixed in suitable mixing equipment 84. Preferably, the application rate of the sodium borohydride to the acid mine discharge is determined by analysis of the iron content of the acid mine discharge. The alkaline mine discharge and the sodium borohydride can be mixed in batches, or the sodium borohydride can be provided as a continuous stream to a stream of alkaline mine discharge using suitable metering equipment. After acid mine discharge and the sodium borohydride are mixed 88, or concomitant with the mixing of the acid mine discharge and the sodium borohydride (not shown), a flocculant 86 is added to aid in forming an iron-containing precipitate 92, in a hold tank 88, which is fitted with a set of strong permanent magnets 90. The iron-containing precipitate 92 is attracted by the magnets 90 which aid in separating the precipitate 92 from the stream of treated acid mine discharge 94. The addition of a flocculating aid might decrease the settling time, but a 20-minute settling time suggests a holding tank or lagoon only 20 times the size of the river flow rate.

EXAMPLE 1

Representatives from the Schuylkill Conservation District in Pennsylvania have suggested that water emanating from the Oakhill Mine complex represents typical "acid mine drainage." Though there are a number of compounds in the water, dissolved iron is very high, and it is understood that the iron is consuming all the dissolved oxygen in the water, destroying all aquatic life. The water must run miles downriver before all the iron finally oxidizes and precipitates, where the river can again sustain life. When samples of the river water were taken and stored for several days left open to the atmosphere, the water was observed to turn yellow-orange. However, when river water samples were taken and stored in an air-tight container with no free air space above the water, the water remained clear. Subsequently, when that container was opened and immediately tested for dissolved oxygen, the reading was zero. This confirms that the dissolved iron will react with all the available oxygen, and will not precipitate until allowed to do so.

Water samples taken directly from the river and allowed to sit untreated for several days all turned yellow-orange and then formed a 'fluffy' precipitate. This phenomenon appears to take at least a day, and suggests why acid mine drainage water has deleterious effects long distances downstream.

The use of BoroMet 1240 (Montgomery Chemicals, PA) to treat this acid mine discharge was evaluated. Samples were taken directly from the Oakhill River and immediately treated. The river water appeared clear, and had a pH of around 6 to 8.Initially, the measured dissolved oxygen was in the range from about 2 to 4 ppm, but dropped as the range was being measured. Oakhill acid mine discharge was treated with BoroMet 1240 at a rate of approximately 100 microliters of BoroMet 1240 per gallon of acid mine discharge (20,000 to 40,000 gallons of water per gallon of BoroMet). Virtually all the iron precipitated in less than 30 seconds, and the precipitates settled in less than 20 minutes. Because the pH of the incoming water was not significantly altered, the treated water could be immediately discharged back to the river.

When approximately 100 microliters of BoroMet 1240 was added to a liter of the acid mine discharge (equivalent to about 20,000 to 40,000 gallons of water to one gallon of BoroMet) the water immediately turned a green color. This reaction was virtually instantaneous. With such a small amount of BoroMet added, there was no appreciable rise in pH. Upon standing undisturbed, the green material formed a light 'fractal aggregate' . . . a light precipitate . . . that settled over time. The green material was left to settle in a 12-inch tall graduated cylinder. Within 15 minutes the top 8 inches of the cylinder were clear, suggesting that a commercial settling tank or lagoon could be employed. Some of the clear fluid was withdrawn from the top of the graduated cylinder, and the pH was increased to approximately 14. No yellow precipitate was observed, suggesting that the iron had been removed.

COMPARATIVE EXAMPLE 1

When samples of river water were adjusted to a pH of 13 to 14 with sodium hydroxide, solution immediately turned yellow, and a precipitate formed. This suggests that an iron-hydroxide complex is being formed which will settle out. Simply adding base to treat the acid mine discharge is likely to be an way impractical to try to treat water, since the cost of the chemicals required both to increase the pH and then to bring it back to a neutral pH are likely to be prohibitive. Likewise, other non-iron metals are not efficiently removed by this method.

EXAMPLE 2

When samples of river water were adjusted to a pH of 13 to 14 with sodium hydroxide and a small amount of BoroMet (approximately 300 ppm), the solution immediately turned yellow, and a precipitate formed, but the precipitate settled faster and was more dense than when the BoroMet was omitted.

EXAMPLE 3

Example 1 was repeated, except that flocculants were added to the treated samples at a rate of 1g of one g of flocculant to 5000g treated sample. Metalsorb and Floquat 3249 both appeared to work well, forming dense precipitates in a few minutes. Likewise, mannitol was used and formed a precipitate within 20 minutes.

EXAMPLE 4

Example 1 was repeated, except that strong neodymium magnets were installed in the settling cylinders. Material was observed to be attracted to the magnets, suggesting that precipitation could be accelerated by the placement of magnets in the treated streams. Similarly, Example 3 was repeated, except that strong neodymium magnets were installed in the settling cylinders, and similar results were obtained.

EXAMPLE 5

Acid mine discharge was treated as described in Example 2. Elemental analyses of a sample of the flocculated material and a sample of the supernatant were performed. The results of the analyses are provided in Tables 1 and 2 below. The analyses show that iron, manganese, magnesium and other metals are removed by the treatment.

TABLE I

Analyses of Supernatant

| Parameter | Result | PQL[1] | Method[2] |
|---|---|---|---|
| Aluminum | <0.5 ppm | 0.5 | Total Quants |
| Antimony | <0.5 ppm | 0.5 | Total Quants |
| Arsenic | <0.5 ppm | 0.5 | Total Quants |
| Barium | <0.5 ppm | 0.5 | Total Quants |
| Beryllium | <0.5 ppm | 0.5 | Total Quants |
| Bismuth | <1.0 ppm | 1.0 | Total Quants |
| Boron | <5.0 ppm | 5 | Total Quants |
| Cadmium | <0.5 ppm | 0.5 | Total Quants |
| Calcium | 5.2 ppm | 5 | ICP MS |
| Cerium | <0.5 ppm | 0.5 | Total Quants |
| Cesium | <0.5 pm | 0.5 | Total Quants |
| Chromium | <0.5 ppm | 0.5 | Total Quants |
| Cobalt | <0.5 ppm | 0.5 | Total Quants |
| Copper | <0.5 ppm | 0.5 | Total Quants |
| Dysprosium | <0.5 ppm | 0.5 | Total Quants |
| Erbium | <0.5 ppm | 0.5 | Total Quants |
| Europium | <0.5 ppm | 0.5 | Total Quants |
| Gadolinium | <0.5 ppm | 0.5 | Total Quants |
| Gallium | <0.5 ppm | 0.5 | Total Quants |
| Germanium | <0.5 ppm | 0.5 | Total Quants |
| Gold | <0.5 ppm | 0.5 | Total Quants |
| Hafnium | <0.5 ppm | 0.5 | Total Quants |
| Holmium | <0.5 ppm | 0.5 | Total Quants |
| Indium | <0.5 ppm | 0.5 | Total Quants |

TABLE I-continued

Analyses of Supernatant

| Parameter | Result | PQL[1] | Method[2] |
|---|---|---|---|
| Iridium | <0.5 ppm | 0.5 | Total Quants |
| Iron | <5.0 ppm | 5 | Total Quants |
| Lanthanum | <0.5 ppm | 0.5 | Total Quants |
| Lead | <0.5 ppm | 0.5 | Total Quants |
| Lithium | <0.5 ppm | 0.5 | Total Quants |
| Lutetium | <0.5 ppm | 0.5 | Total Quants |
| Magnesium | 45 ppm | 5 | ICP MS |
| Manganese | <0.5 ppm | 0.5 | Total Quants |
| Mercury | <0.5 ppm | 0.5 | Total Quants |
| Molybdenum | <0.5 ppm | 0.5 | Total Quants |
| Neodymium | <0.5 ppm | 0.5 | Total Quants |
| Nickel | <0.5 ppm | 0.5 | Total Quants |
| Niobium | <0.5 ppm | 0.5 | Total Quants |
| Osmium | <0.5 ppm | 0.5 | Total Quants |
| Palladium | <0.5 ppm | 0.5 | Total Quants |
| Phosphorus | <0.5 ppm | 0.5 | Total Quants |
| Platinum | <0.5 ppm | 0.5 | Total Quants |
| Potassium | <5 ppm | 5 | ICP MS |
| Praseodymium | <0.5 ppm | 0.5 | Total Quants |
| Rhenium | <0.5 ppm | 0.5 | Total Quants |
| Rhodium | <0.5 ppm | 0.5 | Total Quants |
| Rubidium | <0.5 ppm | 0.5 | Total Quants |
| Ruthenium | <0.5 ppm | 0.5 | Total Quants |
| Samarium | <0.5 ppm | 0.5 | Total Quants |
| Scandium | <0.5 ppm | 0.5 | Total Quants |
| Selenium | <0.5 ppm | 0.5 | Total Quants |
| Silver | <0.5 ppm | 0.5 | Total Quants |
| Sodium | 260 ppm | 5 | ICP MS |
| Strontium | <0.5 ppm | 0.5 | Total Quants |
| Tantalum | <0.5 ppm | 0.5 | Total Quants |
| Tellurium | <0.5 ppm | 0.5 | Total Quants |
| Terbium | <0.5 ppm | 0.5 | Total Quants |
| Thallium | <0.5 ppm | 0.5 | Total Quants |
| Thorium | <0.5 ppm | 0.5 | Total Quants |
| Thulium | <0.5 ppm | 0.5 | Total Quants |
| Tin | <5.0 ppm | 5 | Total Quants |
| Titanium | <1.0 ppm | 1.0 | Total Quants |
| Tungsten | <0.5 ppm | 0.5 | Total Quants |
| Uranium | <0.5 ppm | 0.5 | Total Quants |
| Vanadium | <0.6 ppm | 0.6 | Total Quants |
| Ytterbium | <0.5 ppm | 0.5 | Total Quants |
| Yttrium | <0.5 ppm | 0.5 | Total Quants |
| Zinc | <0.5 ppm | 0.5 | Total Quants |
| Zirconium | <0.5 ppm | 0.5 | Total Quants |

[1]The "PQL" is the practical quantitation limit.
[2]Method. The analysis method employed was either ICP MS (inductively coupled mass spectrometry) or "Total Quants" (total quantitative analysis by atomic absorption spectrometry)

TABLE II

Analysis of Precipitate

| Parameter | Result | PQL[1] | Method[2] |
|---|---|---|---|
| Aluminum | 0.50 ppm | 0.5 | Total Quants |
| Antimony | <0.5 ppm | 0.5 | Total Quants |
| Arsenic | <0.5 ppm | 0.5 | Total Quants |
| Barium | <0.5 ppm | 0.5 | Total Quants |
| Beryllium | <0.5 ppm | 0.5 | Total Quants |
| Bismuth | <1.0 ppm | 1.0 | Total Quants |
| Boron | 20 ppm | 5 | Total Quants |
| Cadmium | <0.5 ppm | 0.5 | Total Quants |
| Calcium | 120 ppm | 5 | IPS MS |
| Cerium | <0.5 ppm | 0.5 | Total Quants |
| Cesium | <0.5 ppm | 0.5 | Total Quants |
| Chromium | <0.5 ppm | 0.5 | Total Quants |
| Cobalt | <0.5 ppm | 0.5 | Total Quants |
| Copper | <0.5 ppm | 0.5 | Total Quants |
| Dysprosium | <0.5 ppm | 0.5 | Total Quants |
| Erbium | <0.5 ppm | 0.5 | Total Quants |
| Europium | <0.5 ppm | 0.5 | Total Quants |
| Gadolinium | <0.5 ppm | 0.5 | Total Quants |
| Gallium | <0.5 ppm | 0.5 | Total Quants |

TABLE II-continued

Analysis of Precipitate

| Parameter | Result | PQL[1] | Method[2] |
|---|---|---|---|
| Germanium | <0.5 ppm | 0.5 | Total Quants |
| Gold | <0.5 ppm | 0.5 | Total Quants |
| Hafnium | <0.5 ppm | 0.5 | Total Quants |
| Holmium | <0.5 ppm | 0.5 | Total Quants |
| Indium | <0.5 ppm | 0.5 | Total Quants |
| Iridium | <0.5 ppm | 0.5 | Total Quants |
| Iron | 50 ppm | 5 | Total Quants |
| Lanthanum | <0.5 ppm | 0.5 | Total Quants |
| Lead | <0.5 ppm | 0.5 | Total Quants |
| Lithium | <0.5 ppm | 0.5 | Total Quants |
| Lutetium | <0.5 ppm | 0.5 | Total Quants |
| Magnesium | 68 ppm | 5 | IPS MS |
| Manganese | 10 ppm | 0.5 | Total Quants |
| Mercury | <0.5 ppm | 0.5 | Total Quants |
| Molybdenum | <0.5 ppm | 0.5 | Total Quants |
| Neodymium | <0.5 ppm | 0.5 | Total Quants |
| Nickel | 0.80 ppm | 0.5 | Total Quants |
| Niobium | <0.5 ppm | 0.5 | Total Quants |
| Osmium | <0.5 ppm | 0.5 | Total Quants |
| Palladium | <0.5 ppm | 0.5 | Total Quants |
| Phosphorus | <0.5 ppm | 0.5 | Total Quants |
| Platinum | <0.5 ppm | 0.5 | Total Quants |
| Potassium | <5 ppm | 5 | IPS MS |
| Praseodymium | <0.5 ppm | 0.5 | Total Quants |
| Rhenium | <0.5 ppm | 0.5 | Total Quants |
| Rhodium | <0.5 ppm | 0.5 | Total Quants |
| Rubidium | <0.5 ppm | 0.5 | Total Quants |
| Ruthenium | <0.5 ppm | 0.5 | Total Quants |
| Samarium | <0.5 ppm | 0.5 | Total Quants |
| Scandium | <0.5 ppm | 0.5 | Total Quants |
| Selenium | <0.5 ppm | 0.5 | Total Quants |
| Silver | <0.5 ppm | 0.5 | Total Quants |
| Sodium | 320 ppm | 5 | IPS MS |
| Strontium | 0.90 ppm | 0.5 | Total Quants |
| Tantalum | <0.5 ppm | 0.5 | Total Quants |
| Tellurium | <0.5 ppm | 0.5 | Total Quants |
| Terbium | <0.5 ppm | 0.5 | Total Quants |
| Thallium | <0.5 ppm | 0.5 | Total Quants |
| Thorium | <0.5 ppm | 0.5 | Total Quants |
| Thulium | <0.5 ppm | 0.5 | Total Quants |
| Tin | <5.0 ppm | 5 | Total Quants |
| Titanium | <1.0 ppm | 1.0 | Total Quants |
| Tungsten | <0.5 ppm | 0.5 | Total Quants |
| Uranium | <0.5 ppm | 0.5 | Total Quants |
| Vanadium | <0.6 ppm | 0.6 | Total Quants |
| Ytterbium | <0.5 ppm | 0.5 | Total Quants |
| Yttrium | <0.5 ppm | 0.5 | Total Quants |
| Zinc | <0.5 ppm | 0.5 | Total Quants |
| Zirconium | <0.5 ppm | 0.5 | Total Quants |

[1] The "PQL" is the practical quantitation limit.
[2] Method. The analysis method employed was either ICP MS (inductively coupled mass spectrometry) or "Total Quants" (total quantitative analysis by atomic absorption spectrometry)

EXAMPLE 6

Acid mine discharge was treated on a continuous basis, under condition similar to those employed in Example 1. The treatment reduced manganese from 7 ppm to under 0.5 ppm.

EXAMPLE 7

Acid mine discharge was first treated with calcium carbonate at a rate sufficient to alter the pH to over 9. The resulting water was further treated with sodium borohydride at a rate of 10 ppm to 500 ppm. In comparison with treatment with calcium carbonate alone, further reductions in the levels of manganese and other elements were observed. For example, the manganese level were was approximately 7 ppm in the mine water, and when left untreated with sodium borohydride, only dropped to approximately 5 ppm. Upon the introduction of the sodium borohydride, the final manganese level was less than the 0.5 ppm lower detectable limit of the test.

EXAMPLE 8

Example 7 was repeated, except that 1g/l of a flocculant (Metalsorb) was added. The precipitate settled at an observably faster rate then it did without the addition of the flocculant.

Various modifications can be made in the details of the various embodiments of the processes of the present invention, all within the scope and spirit of the invention and defined by the appended claims.

The invention claimed is:

1. A process for treating acid mine discharge, the process comprising:
    a) providing a stream of acid mine discharge including iron, the stream having a flow rate;
    b) providing sodium borohydrid;
    c) providing a base, in sufficient quantity such that a mixture of the base, the sodium borohydride, and the stream of acid mine discharge has a pH form about 7 to about 13;
    d) mixing the base with the stream of acid mine discharge;
    e) mixing the sodium borohydride with the stream of acid mine discharge, a precipitate being formed in the mixture; and
    f) separating the precipitate from the stream of acid mine discharge.

2. A process according to claim 1 further comprising adding a flocculant to flocculate the precipitate.

3. A process according to claim 2 wherein the flocculant is effective to provide a flocculated precipitate having a solids content of greater than 2 percent by weight.

4. A process according to claim 2 wherein the flocculant is selected from the group consisting of acrylamide polymers and copolymers of acrylamide and acrylic acid.

5. A process according to claim 1 further providing a holding tank for retaining the mixture of sodium borohydride and acid mine discharge.

6. A process according to claim 1 wherein the sodium borohydride is provided as an aqueous solution.

7. A process according to claim 6 wherein the aqueous solution is an alkaline aqueous solution.

8. A process according to claim 7 wherein the alkaline aqueous solution includes sodium hydroxide.

9. A process according to claim 8 wherein the aqueous solution comprises from about 10 percent by weight sodium borohydride and from about 38 to about 42 percent by weight sodium hydroxide.

10. A process according to claim 1, the process further comprising providing sodium bisulfite and mixing the sodium bisulfite with the sodium borohydride before mixing the sodium borohydride with the acid mine discharge.

11. A process according to claim 10 wherein the weight ratio of sodium borohydride to sodium bisulfite is from about 1 to 6 to about 1 to 12.

12. A process according to claim 1 further comprising subjecting the mixture of the sodium borohydride with the stream of acid mine discharge to a magnetic field, the magnetic field having an average magnetic field strength in the mixture of from about 0.2 Tesla to about 3 Tesla.

13. A process according to claim 1 further comprising discharging the mixture of acid mine drainage and sodium borohydride to a retention pond.

14. A process according to claim 13 further comprising retaining the mixture of acid mine drainage and sodium borohydride in the retention pond for less than 12 hours.

15. A process for treating acid mine discharge, the process comprising:
   a) providing a stream of acid mine discharge including iron, the stream having a flow rate;
   b) providing sodium borohydride;
   c) providing calcium carbonate;
   d) mixing the sodium borohydride and the calcium carbonate with the stream of acid mine discharge, a precipitate being formed; and
   e) separating the precipitate from the stream of acid mine discharge.

16. A process according to claim 15 further comprising mixing sufficient base with the sodium borohydride such that the mixture of sodium borohydride and acid mine discharge has a pH from about 7 to about 13.

17. A process according to claim 15 wherein calcium carbonate is provided in the form of limestone.

18. A process according to claim 15 wherein the calcium carbonate is mixed with the acid mine discharge before mixing the sodium borohydride with the acid mine discharge.

* * * * *